United States Patent [19]

Yoshida et al.

[11] Patent Number: 5,041,916
[45] Date of Patent: Aug. 20, 1991

[54] COLOR IMAGE DATA COMPRESSION AND RECOVERY APPARATUS BASED ON NEURAL NETWORKS

[75] Inventors: Kunio Yoshida; Motohiko Naka; Mie Saitoh, all of Kawasaki; Takehisa Tanaka, Tokyo, all of Japan

[73] Assignee: Matsushita Electric Industrial Co., Ltd., Japan

[21] Appl. No.: 474,396

[22] Filed: Feb. 6, 1990

[30] Foreign Application Priority Data

Feb. 7, 1989 [JP] Japan .................................. 1-18187
Feb. 16, 1989 [JP] Japan .................................. 1-36783

[51] Int. Cl.$^5$ .............................................. H04N 1/40
[52] U.S. Cl. .................................................. 358/433
[58] Field of Search ............... 358/429, 432, 261.1, 358/261.2, 261.3, 261.4, 262.1, 80, 433

[56] References Cited

U.S. PATENT DOCUMENTS 4,965,725 10/1990 Rutenberg ............................ 382/36

FOREIGN PATENT DOCUMENTS 1141495 6/1989 Japan .

OTHER PUBLICATIONS

Richard Lippmann, An Introduction to Computing with Neural Nets, Apr. 1987, pp. 4-22.

Primary Examiner—Edward L. Coles, Sr.
Assistant Examiner—Jerome Grant, II
Attorney, Agent, or Firm—Lowe, Price, LeBlanc & Becker

[57] ABSTRACT

A data compression and recovery apparatus compresses picture element data of a color image by expressing two primary color values of each picture element as a set of parameter values of a neural network in conjunction with reference color data values of a corresponding block of picture elements. Date recovery is achieved by inputting each block of reference color values to a neural network while establishing the corresponding set of parameter values in the network, to thereby obtain the original pair of encoded primary color values for each of successive picture elements. The third primary color can be used as the reference color.

11 Claims, 6 Drawing Sheets $y = F(W_{1j} \times x_1 + W_{2j} \times x_2 + \cdots + W_{ij} \times x_i)$

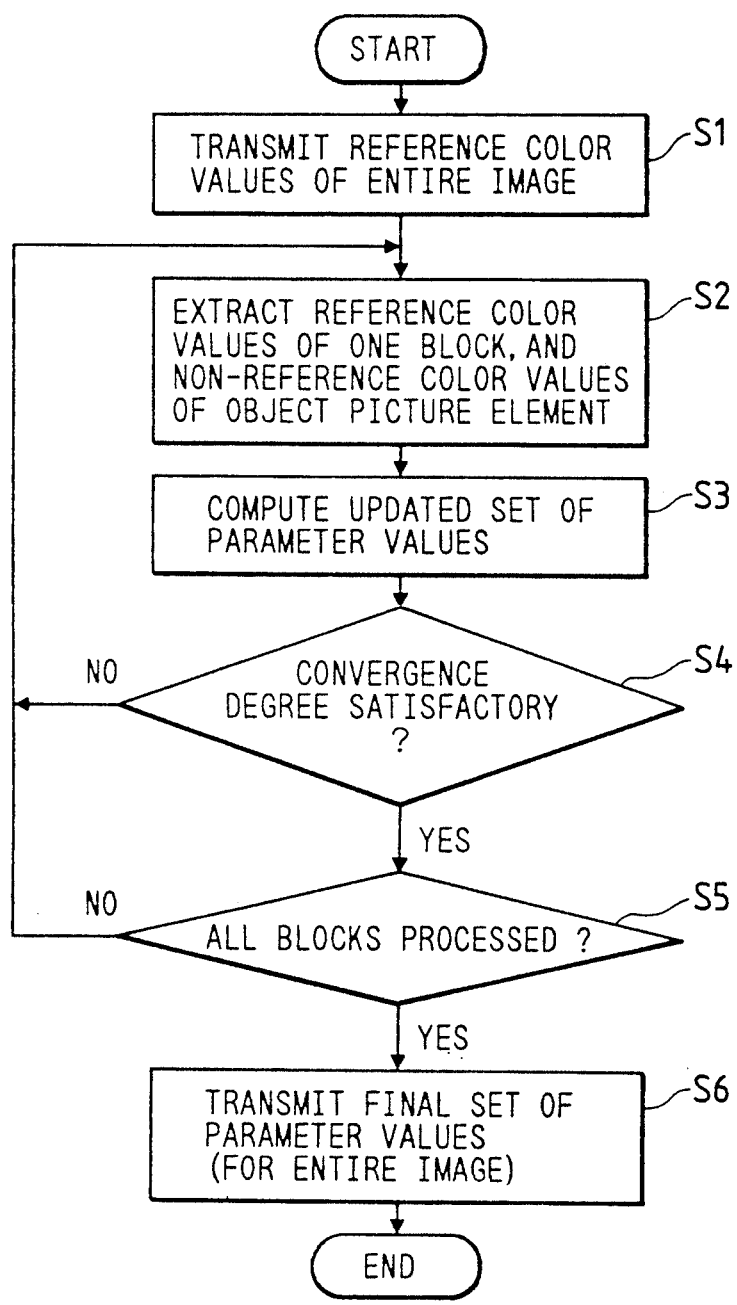

COLOR IMAGE DATA COMPRESSION AND RECOVERY APPARATUS BASED ON NEURAL NETWORKS

BACKGROUND OF THE INVENTION

1. Field of Application

The present invention relates to an apparatus for code length compression and subsequent recovery of data. More specifically, the invention relates to an apparatus for compression (encoding) and recovery (decoding) of data representing the picture elements of a color image as respective tricolor values, each consisting of a set of three primary color data values.

2. Prior Art Technology

Data compression and recovery processing to reduce the code length of data that are to be transmitted or stored, can be applied to color image data that are generated in a variety of applications. These include the pre-processing of color image data before storage in a memory device and post-processing at the time of readout, to reduce the amount of memory capacity required, pre-processing of color image data before transmission by a facsimile apparatus and post-processing of the received data, to reduce the amount of transmitted data, etc. In the following it will be assumed that data representing a color image consist of an array of picture elements. The image data can be generated for example as one frame of a color video signal from a video camera, or by sequentially scanning a color image by a mechanical type of scanning apparatus. With one prior art method for such a color image data compression and recovery apparatus, a color image is divided into a succession of identical-size blocks, each consisting of an array of picture elements. During data compression processing the blocks are processed successively. In that processing, the levels of one primary color component (i.e. reference color component) of respective picture elements of a block are successively generated and transmitted (or recorded) after having been combined with derived data representing values (for each block) of polynomial function expansion coefficients, which can be subsequently used in conjunction with the reference color component data to recover the other two primary color components of each picture element, by polynomial function expansion computations for the respective blocks. Such a method is described for example by Kodera et al, in Japanese Patent Laid-open Application No. 141495.

That method is based upon the fact that there will generally be a high degree of correlation between the relative proportions of the three primary color components of the picture elements within a block. The primary colors can be selected as either red (R), green (G) and blue (B) or cyan, magenta and yellow, however it will be assumed in the following that an R, G, B system is used. Examples of such correlation between R, G and B components of a color image are given in that prior art patent, as sets of correlation coefficients for picture elements within such a block of a color image, for the cases of several typical image regions.

It is thereby shown that there is in general a high degree of correlation between the primary color components within each block. This enables color image data compression to be achieved, by transmitting only the reference color values for the respective picture elements together with expansion coefficients for the respective blocks, with data recovery being subsequently executed by using the reference color data and the expansion coefficients of each block to derive data for the other two primary color components of each picture element, by successive polynomial equation computations.

FIG. 1 is a basic block system diagram for illustrating a color image data compression apparatus based on the above principles. Numeral 100 denotes a source of color image data in the form of a picture element array, which are supplied to a block extraction section 101 in which the image data are divided into a number of blocks each consisting of an M by N array of picture elements. The blocks are processed successively, with the R (red), B (blue) and green (G) primary color component data of a block being outputted on three respective lines as the block data 102. One of these primary color data components is used as reference color data, and is outputted on line 106. The block data 102 are supplied to a computation section 103, in which polynomial expansion coefficients are computed for each block, which will subsequently enable the respective non-reference color components of each picture element of the block to be approximately computed based on the reference color components. These coefficients 104 are outputted from the encoding apparatus together with the reference color data, as the output code data 105. Assuming that an R, G, B system is used and that the green component is selected as the reference color, then designating the G component of a picture element at a position (i, j) within a block as $G_{i,j}$, the corresponding B and R components of that picture element will be designated as $B_{i,j}$ and $R_{i,j}$ respectively. Values for two sets of polynomial expansion coefficients $b_k$ and $r_k$ are then computed (where k=0, 1, 2, ... h). The values of these coefficients are such as to enable the values $B_{i,j}$ and $R_{i,j}$ to be subsequently approximately derived from $G_{i,j}$ and these expansion coefficients by utilizing the following h-order polynomial equations:

$$B_{i,j} = \Sigma b_k f_k(G_{i,j})$$

$$R_{i,j} = \Sigma r_k f_k(G_{i,j})$$

However such a prior art method has the disadvantage that the color values that are obtained at the time of data recovery for each picture element (other than the reference color value for that element), i.e. $B_{i,j}$ and $R_{i,j}$, are obtained by using optimized polynomial expansion coefficients with specific polynomial equations which are fixedly predetermined. The method is therefore not capable of executing non-linear processing to optimize the results obtained. As a result, the level of error that is obtained at the time of data recovery, i.e. the degree of error between the predicted color values that are obtained for respective picture elements and the actual color values will be highly dependent upon the characteristics of the original color image, and it is not possible to consistently achieve a very low amount of error.

SUMMARY OF THE INVENTION

It is an objective of the present invention to overcome the disadvantages of the prior art as set out above, by providing a color image data compression and recovery apparatus having a data compression apparatus and a data recovery apparatus, in which the data compression apparatus functions such that for each of successive picture elements of a source image, a reference color (e.g. green) value is transmitted together with a set of parameter values of a neural network within the data compression apparatus. These parameter values are determined such that when that set of parameter values and also the reference color values for each of an M×N block of picture elements containing the aforementioned picture element have been received by the data recovery apparatus and supplied to a neural network in the data recovery apparatus that is identical to that of the data compression apparatus, the non-reference primary color values for that picture element are obtained as respective output values from that neural network, to a high degree of accuracy. At the time of data compression, the source image data (formed as a picture element array) are successively scanned to extract successive blocks of M×N picture elements. These blocks successively overlap, i.e. one row of blocks is obtained by consecutively extracting M×N picture element sets which successively differ in horizontal position by one picture element, and with successive rows of blocks differing in vertical position by one picture element. As each block is extracted from the source image data, the reference color (e.g. G) values of the picture elements of the block are applied in parallel to respective inputs of the neural network of the data compression apparatus, while the two non-reference (e.g. R and B) primary color values for one picture element which is at a fixed position (e.g. center position) of the block are supplied to respective subtractor circuits which receive respective output values from the neural network. With one embodiment of the invention, "learning" processing operation of the neural network is then executed using a predetermined algorithm, to obtain a set of parameter values for the neural network whereby the aforementioned output values from the neural network are substantially respectively identical to the two non-reference primary color values. The process is then repeated for the next block, and so on. The encoded outputs produced from the data recovery apparatus consist of the respective sets of optimized parameter values for the various blocks, together with the reference color values for all of the picture elements of the source image. In the data recovery apparatus, the parameter values for each block are supplied to the neural network of the data recovery apparatus together with the reference color values for the picture elements of the block, to thereby obtain as output from that neural network the two non-reference primary color values for the picture element at the aforementioned fixed position within the block.

With another embodiment of the invention, at the start of image processing by the data compression apparatus, a first set of parameter values for the neural network are obtained (without repetitive optimizing processing being executed) for a first block of the source image, i.e. based on the amount of error in the output values thus obtained from the neural network, a first set of parameter values are derived. These are then applied to the neural network while the reference color data of the next block are being supplied to the network, and a new set of parameter values obtained, which are then applied in the same way for the next block, and so on until the final block of the source image. The above process is thereafter successively repeated, until a final set of parameter values are obtained which will provide a sufficiently low degree of error when utilized for each of the blocks of the source image. That set of parameter values is then transmitted, together with the reference color values of all of the picture elements of the source image.

More specifically, according to a first aspect, the invention provides a data compression and recovery apparatus for compressing and subsequently recovering source image data expressing a source image as an array of tricolor data sets each consisting of three primary color data values of a corresponding picture element of the source image, the apparatus comprising a data compression apparatus and a data recovery apparatus, in which the data compression apparatus comprises:

a first neural network first block extraction means for extracting successive blocks of m by n tricolor data sets from the source image data array, where m and n are fixed integers, the blocks respectively mutually overlap by one picture element position, and each of the reference color data values is derived from a corresponding one of the tricolor data sets, and for applying the reference color data values of an extracted block as parallel inputs of the first neural network, while outputting a pair of primary color data values of an object picture element at a fixed position within the extracted block;

comparator means for comparing the pair of primary color data values with output data values produced from the neural network;

learning control means for receiving a signal representing respective current states of a set of network parameter values of said neural network and receiving comparison signals produced from the comparator means, and for repetitively generating and establishing in the first neural network updated sets of network parameter values, until a predetermined degree of convergence is indicated by the comparator means output signals; and output control means for transmitting as compressed output data the reference color data values of all of the source image together with, for each of the blocks, a corresponding set of network parameter values which provide the degree of convergence;

and in which the data recovery apparatus comprises:

a second neural network;

input control means for receiving the transmitted reference color data values and sets of network parameter values;

second block extraction means for extracting successive blocks of m by n reference color data values from the received reference color data values, and;

means for establishing successive ones of the sets of network parameter values in the second neural network in synchronism with applying corresponding ones of the blocks of reference color data values as inputs to the second neural network, to obtain as output data values from the second neural network successive pairs of primary color data values for respective picture elements of the source image.

According to a second aspect, the invention provides data compression and recovery apparatus for compressing and subsequently recovering source image data expressing a source image as an array of tricolor data sets each comprising three primary color data values of a corresponding picture element of the source image, the apparatus comprising a data compression apparatus and a data recovery apparatus, in which the data compression apparatus comprises:

a first neural network;

first block extraction means for extracting successive blocks of m by n reference color data values from the source image data array, where m and n are fixed integers, the blocks successively mutually overlap by one picture element position, and each of the reference color data values is derived from a corresponding one of the tricolor data sets, and for supplying the data values of an extracted block as parallel inputs to the first neural network while outputting a pair of primary color data values of an object picture element which is at a fixed position within the extracted block;

comparator means for comparing the pair of primary color data values with output data values produced from the neural network;

learning control means coupled to receive a signal representing respective current states of a set of network parameter values of said neural network and to receive comparison output signals produced from the comparator means, for repetitively executing a procedure whereby data values of an extracted block are supplied to input terminals of the first neural network, an updated set of network parameter values is derived based on a current set of network parameter values and on the comparator output signals, the updated set of network parameter values are established in the neural network, and data values of a succeeding block are applied as inputs to the neural network, the procedure being repeated for all of the source image a plurality of times, until a desired degree of convergence is obtained between the neural network output data values and pairs of object picture element primary color data values for substantially all of the blocks; and output control means for transmitting, as compressed output data, the reference color data values of all of the source image together with a final set of network parameter values established at completion of the procedure repetitions;

and in which the data recovery apparatus comprises:

a second neural network of identical configuration to the first neural network;

input control means for receiving the transmitted reference color data values and set of network parameter values;

second block extraction means for extracting successive blocks of m by n reference color data values from the received reference color data values, and;

control means for fixedly establishing the set of network parameter values in the second neural network and for successively applying the blocks of reference color data values as inputs to the second neural network, for thereby obtaining as output data values from the second neural network successive pairs of primary color data values for respective picture elements of the source image.

BRIEF DESCRIPTION OF THE DRAWINGS

FIG. 9 is a flow diagram for illustrating the overall operation flow of a second embodiment of the invention.

DESCRIPTION OF PREFERRED EMBODIMENTS

Figure 1:
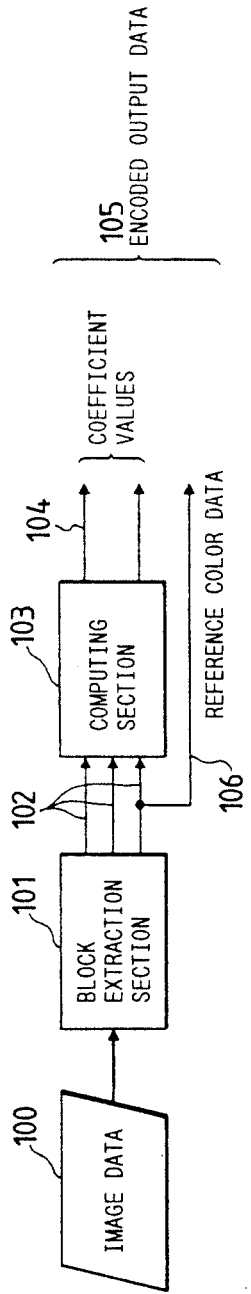
FIG. 1 is a general block diagram of a prior art data compression apparatus for color image data.
Figure 2A:
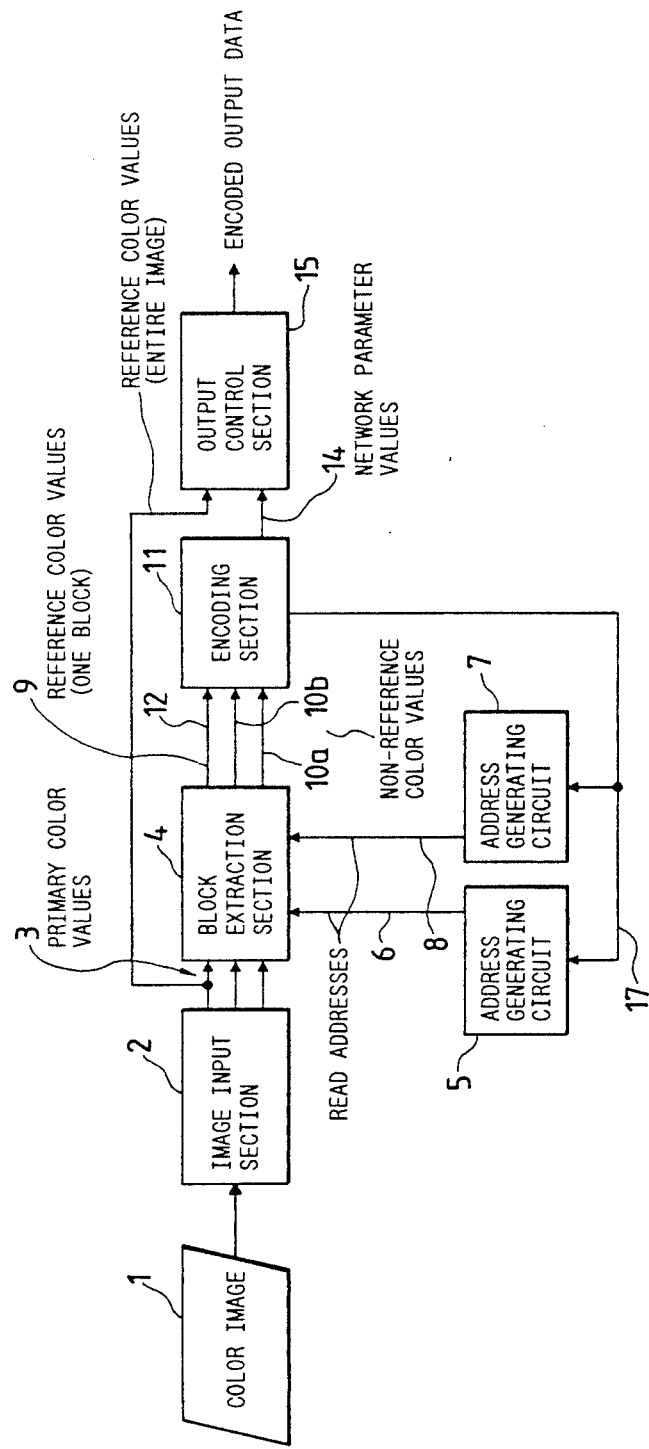
FIG. 2A is a general block diagram of a data compression apparatus of a first embodiment of a data compression and recovery apparatus according to the present invention.
Figures 2B, 3:
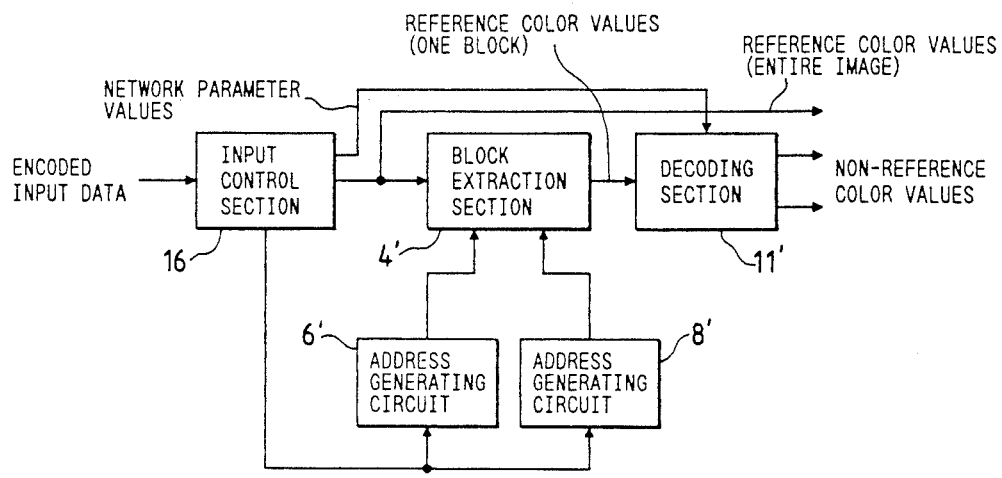
FIG. 2B shows a corresponding data recovery apparatus.
FIG. 3 is a diagram for illustrating extraction of successive blocks of data values of a source image.

FIG. 2A is a general system block diagram of a data compression apparatus of an embodiment of a color image data compression and recovery apparatus according to the present invention, while FIG. 2B is a system block diagram of a corresponding data recovery apparatus. In FIG. 2A, a source color image formed as an array of picture elements 1 is color-analyzed by an image input section 2, to obtain image date representing the source image as an array of picture elements and to obtain respective tri-color data values for these picture elements. It will be assumed that these data are generated as digital values, or are converted from analog to digital form upon output from the image input section 2. These tri-color data values (e.g. respective sets of R, G and B or C, M, Y primary color component values for each of the picture elements constituting the source image) are transferred to a block extraction section 4, and will be referred to in the following simply as the original color image data. The image input section 2 may in practice consist for example of a color television camera, or a mechanical rotary scanner apparatus. The block extraction section 4 contains a first memory in which the outputs from the image input section 2 are stored, and functions to extract successive blocks of the color image data from the array of (tricolor) data values thus stored in the first memory, with each block being temporarily stored in a second memory of the block extraction section 4. Each block is an M×N array of color image data values, e.g. corresponding to a 3×3 picture element array, and the picture elements of a block are successively read out from the second memory of the block extraction section 4, to be transferred to an encoding section 11. The encoding section 11 contains a neural network, and the encoding operation executed by the encoding section 11 consists of generating respective sets of neural network parameter values in correspondence with successive blocks, as described in detail hereinafter. Read-out operations from the first memory of the block extraction section 4 for extracting successive blocks of data are controlled by first read address signals that are generated by an address generating circuit 5, while readout operations from the second memory of the block extraction section 4 for outputting tri-color data of successive picture elements of a block are controlled by second read address signals that are generated by an address generating circuit 7. Operations of these circuits 5 and 7 are controlled by timing signals which are produced from the encoding section 11.

For brevity of description, it will be assumed in the following that an R, G, B primary color system is used and that the G (green) color component is used as a reference component. In this case the reference G value of each tricolor data value of a block that is read out from the block extraction section 4 is supplied to an input terminal 12 of the encoding section 11 and is also supplied to an input of an output control section 15, while the R and G component values for a single picture element that is in a fixed position within the block (e.g. a central position) are supplied as signals 10a, 10b to respective input terminals 13a, 13b of the encoding section 11. The encoding section 11 executes operations under the control of control means (not shown in the drawings) such as a programed microprocessor, whereby an optimized set of parameter values for the encoding section 11 is generated for each of the blocks of color image data supplied from the block extraction section 4. The respective sets of neural network parameter values that are thereby obtained are combined in the output control section 15 with the reference color data values for all of the picture elements of the source image, to thereby obtain an encoded data output signal 16.

Figure 4:
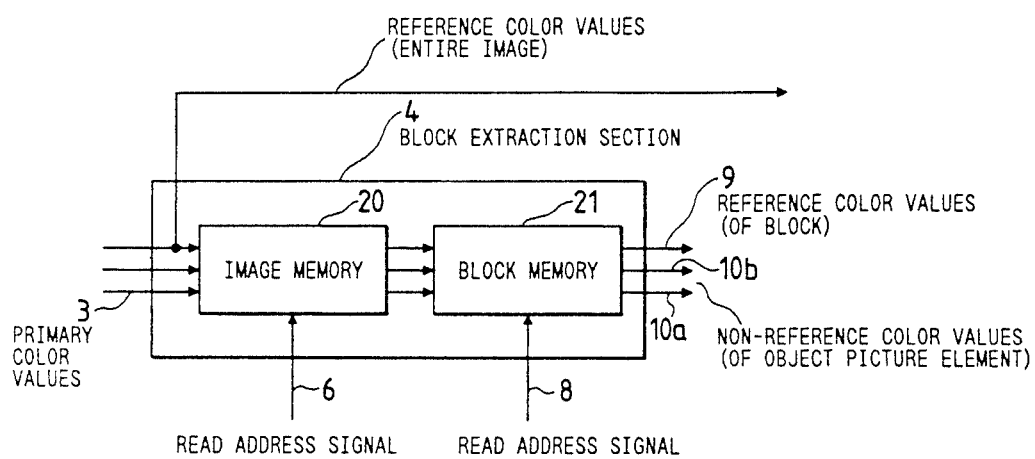
FIG. 4 is a block diagram of a block extraction section in the first embodiment.

FIG. 4 is a simple block diagram for illustrating the configuration of the block extraction section 4. As shown, the tricolor data values 3 for successive picture elements of the source image are supplied to an image memory 20, and stored therein. Subsequently, successive blocks of that stored data are read out from the memory 20 under the control of the first read address signal 6, and are stored one at a time in the block memory 21. When a block has thus been stored in memory 21, the reference color components of successive tricolor data values of that block are then sequentially read out under the control of the second read address signal 8, to be supplied to the encoding section 11. At the same time, the R and B (i.e. non-reference color) data values for the aforementioned picture element at a fixed position within the block (e.g. the central position) are read out from the block memory 21 and supplied to the encoding section 11.

FIG. 2B shows the data recovery apparatus of this embodiment. Depending upon the particular application, the encoded data that are produced from the data compression apparatus of FIG. 2A may for example be transmitted to a distant data recovery apparatus, or may be recorded and subsequently played back, with the playback encoded data being inputted to a local data recovery apparatus. The encoded data are inputted to an input control section 16, which separates the neural network parameter value data therein, and supplies the parameter values of successive blocks to a decoder section 11', which contains a neural network that is identical in configuration to that of the encoder section 11 of the data compression apparatus of FIG. 2A. The input control section 16 also outputs the reference color data values (which in this example are assumed to be G values as stated above) and supplies these to a block extraction section 4', which can be of similar configuration to the block extraction section 4 of FIG. 2A. The reference color data values are stored in an image memory within the block extraction section 4', and successive blocks of these stored reference color data values (corresponding in size, and read-out sequence to the blocks of the data compression apparatus described above) are subsequently read out and each block stored temporarily in a block memory of the block extraction section 4'. Each time a block has thus been assembled in that block memory, the reference color data values for successive picture element positions of the block are successively read out and transferred to an input of the encoding section 11'. At the same time, the set of neural network parameter values corresponding to that block are transferred from the input control section 16 to the encoding section 11', whereby the encoding section 11' produces as output values therefrom the R and B component values for the picture element that is in the aforementioned fixed position within the block. At the same time, the block extraction section 4' outputs on line 17 the G (reference) component value for that picture element.

The above procedure is executed for each of the blocks of the received encoded data in succession, to thereby obtain recovered tricolor data values for each of the picture elements of the color image.

FIG. 3 illustrates the manner in which the tricolor data values of respective picture elements are stored in the image memory of the block extraction section 4 (or reference color data values are stored in the image memory of the block extraction section 4'), with the respective data values being designated as $P_{0,0}$, $P_{0,1}$, ... etc. Assuming that each block corresponds to a 3×3 array element, then the first block to be "cut out" from the stored data in the image memory 20 (as a result of read address signals supplied from the address generating circuit 7) will be the set shown within the thick-line rectangle, extending from $P_{0,0}$ to $P_{2,2}$. The second block to be cut out will be that indicated by the broken-line rectangle, extending from $P_{0,1}$ to $P_{2,3}$. In actuality, as described in detail hereinafter, the reference color data values of a block which are successively read out from the block memory 21 are temporarily held in a shift register within the encoding section 11, to be applied in parallel to internal inputs of the neural network of the encoding section 11, so that it can be considered that the reference color data values of a block are in effect applied in parallel to respective input terminals of the encoding section 11.

Figure 5:
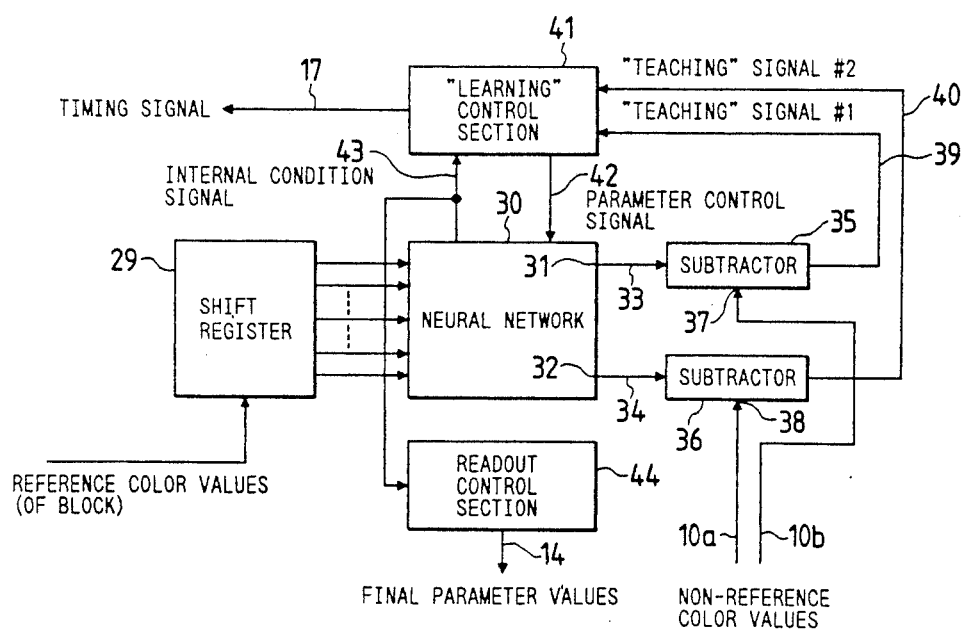
FIG. 5 is a system block diagram of a data encoding section of the first embodiment, based on a neural network.

FIG. 5 is a system block diagram showing the internal configuration of the encoding section 11. The reference color signal 9 from the block extraction section 4 is applied to an input terminal of a shift register 29, and when the reference color data values of a block are successively read out from the block memory 21 these are successively shifted into the shift register 29. When all of the block data values have thus been shifted in, the values are thereafter held in the shift register 29 until shifting in of the next block begins, and are fixedly outputted in parallel from the shift register 29 to a set of input terminals of a neural network 30. Assuming as stated above that green is used as the reference color, the R and B components of the aforementioned one picture element at a fixed position within the block (referred to in the following as the object picture element of the block, for brevity of description) are at this time fixedly supplied from the block memory 21 of the block extraction section 4, as signals 10a, 10b respectively, to respective input terminals 37a, 38a of two subtractors 35 and 36. Two output values produced from the neural network 30 are supplied, as signals 33, 34, to respective input terminals 37b, 38b of the subtractor 35 and 36 respectively. The output signals produced from the subtractor 35 and 36, representing respective amounts of difference between the R and B values of the object picture element of the block and the outputs 33, 34 from the neural network 30, will be referred to as first and second "teaching signals", since the information contained in these signals is used by the encoding section 11 in "learning" a set of internal parameter values which will render the output values 33, 34 respectively substantially identical to the R and B component values of the object picture element that are supplied to the subtractors 35 and 36. These teaching signals 39 and 40 are inputted to a "learning" control section 41, together with an internal condition signal 43 that is outputted from the neural network 30. The internal condition signal 43 conveys information representing the respective current parameter values of the neural network 30. In response to these inputs, the "learning" control section 41 generates a control signal 42 which conveys information for updating the parameter values of the neural network 30 in a direction tending to make the output values 33, 34 from the neural network 30 to become respectively closer to the R and G values supplied to the subtractors 35, 36. The values which are outputted from the neural network 30 as the signals 33, 34 will be referred to as prediction values, since these predict the values of the R and G components of the object picture element based upon the levels of the reference color components of all of the picture elements of the corresponding block.

With this embodiment, a specific "teaching" algorithm computation is repetitively executed by the "learning" control section 41, utilizing for each execution the current values of the teaching signals 39, 40 and internal condition signal 43, with an updated set of parameter values being outputted from the "learning" control section 41 as the control signal 42 each time that an algorithm computation repetition has been completed. Examples of such algorithms for use in a neural network are known in the art, for example as described by D. E. Runmelhart et al, in "Parallel Distributed Processing", Vol. 8, M.I.T. Press, Cambridge, (1986). Specifically, such an algorithm results in successively updated sets of parameter values being generated whereby the absolute values of the outputs 33, 34 from the neural network converge towards the target values (i.e. in this example, the R and B data values). Repetition of the algorithm computation repetitions is halted when each of the differences between the prediction values 33, 34 and the R and B values falls below a predetermined absolute value, i.e. when a predetermined degree of convergence is attained. This judgment is executed within the "learning" control section 41.

Each time such a degree of convergence is attained, the current set of parameter values of the neural network 30 are transferred from the "learning" control section 41 to a readout control section 44, to be outputted as the signal 14 to the output control section 15 and thereafter transmitted to a data recovery apparatus (or recorded on a storage medium). At that time, the "learning" control section 41 sends a timing signal 17 to the address generating circuits 5 and 7, which respond by beginning to "cut out" the next block and send the color data of the block to the shift register 29 and to the subtractors 35, 36 in the same way as described above. The above process is then repeated, to obtain a set of neural network parameter values which provide convergence for the next block, and so on.

With this embodiment, the reference color data for all of the picture elements of the source image are first transmitted from the output control section 15, then the successively obtained sets of neural network parameter values for the respective blocks are transmitted. In the data recovery apparatus which receives these transmitted data, the reference color data are first stored in an image memory of the input control section 16, and thereafter each of successive blocks of the stored data is "cut out" and supplied to the neural network of the encoding section 11' together with the corresponding set of data values. The R and B components of the object picture elements of successive blocks can thereby be recovered as output values produced from the neural network of the encoding section 11', so that R, G and B component values for all of the picture elements in a recovered image are obtained, with a high degree of accuracy of reproduction.

It will be apparent that accurate reproduction will not be achieved for a small number of picture elements extending around the periphery of the recovered color image, since complete blocks cannot be configured for these. However in general this will not be a significant problem, in the case of an image formed of a large number of picture elements.

Figure 6:
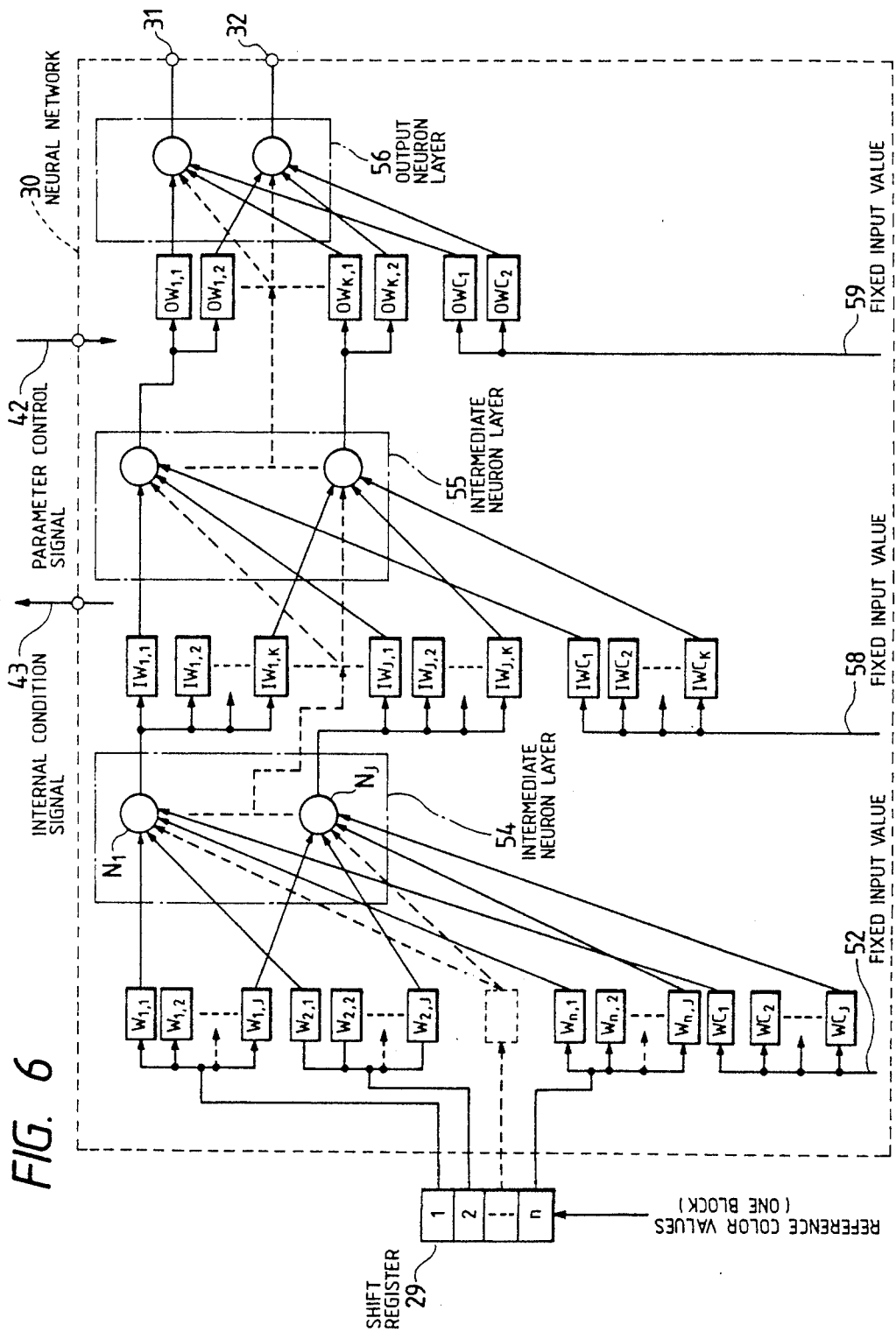
FIG. 6 shows details of the configuration of the neutral network of FIG. 5.

FIG. 6 illustrates the internal configuration of the neural network 30. The number of picture elements constituting one block will be designated as n. The reference color data values of one block which are outputted in parallel from the shift register 29, after having been successively read out from the block memory 21 of the block extraction section 4 as described above, are transferred from respective input terminals $T_1$ to $T_n$ of the neural network 30, and are then multiplied by respective weighting coefficients. Specifically, the first reference color data value is multiplied by each of a set of j weighting coefficients $W_{1,1}$ to $W_{1,j}$, where j is an integer. Similarly, the second reference color data value is multiplied by each of a set of j weighting coefficients $W_{2,1}$ to $W_{2,j}$, . . . and the $n^{th}$ reference color data value is multiplied by each of a set of weighting coefficients $W_{n,1}$ to $W_{n,j}$. The respective sets of results obtained from these multiplications are applied to corresponding inputs of a set of neuron elements $N1_1$ to $N1_j$ of a first intermediate neuron layer 54, i.e. with one of each of the aformenentioned sets of results being inputted to a first neuron element $N_1$, one of each of the second set of results being inputted to a second neuron element $N_2$, and so on. In addition, a fixed input data value 52 is multiplied by each of a set of j weighting coefficients $WC_1$ to $WC_j$, and the respective results applied to inputs of each of the neuron elements $N1_1$ to $N1_j$.

The output results thus obtained from the first intermediate neuron layer 54 are then similarly processed, in conjunction with a fixed data value 58 that is multiplied by weighting coefficients $IWC_1$ to $IWC_k$, by j sets of weighting coefficients $IW_{1,1}$ to $IW_{1,k}$, $IW_{2,1}$ to $IW_{2,k}$, . . . $IW_{j,1}$ to $IW_{j,k}$ and a second intermediate neuron layer 55. The output results thus obtained are respectively multiplied by k sets of two weighting coefficients, $OW_{1,1}$ to $OW_{1,2}$ . . . $OW_{k,1}$ to $OW_{k,2}$, and results obtained are similarly applied, together with results obtained by multiplying a fixed data value 59 by weighting coefficients $OWC_1$ and $OWC_2$, to a final pair of neuron elements $N3_1$, $N3_2$ of an output neuron layer 56. The output results from that pair of neuron elements are respectively supplied to the output terminals 31, 32, to be inputted to the subtractors 35 and 36 respectively.

In this embodiment, respective values of the weighting coefficients of the neural network 30 constitute the internal parameter values referred to hereinabove. The neural network 30 can be implemented either as in hardware form, or in "software" form (i.e. by microprocessor operations executed under a suitable control program). In the case of a physical implementation, the weighting coefficients can consist of values stored in respective registers, which are repetitively updated by the control signal 43 from the "learning "

control section 41. That is to say, these registers can be successively scanned to insert therein corresponding values conveyed by the control signal 42, to thereby update the weighting coefficient values. Similarly the internal condition signal 43 can be formed by successively scanning these coefficient value registers to read out the current contents thereof.

Figure 7:
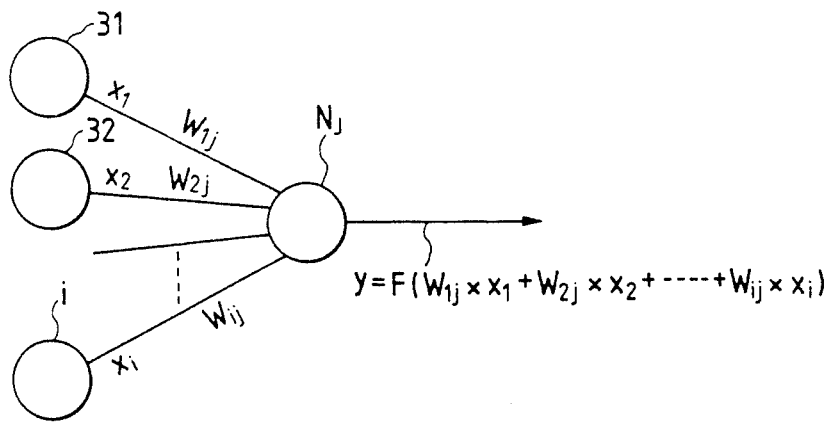
FIG. 7 is a diagram for describing the operation of neuron units in the neuron network of FIG. 6.

Each of the neuron elements $N1_1$ etc. has a non-linear characteristic with respect to the sum total of the input data values applied thereto. This can for example have a sigmoid shape of characteristic. The neuron element operation is illustrated in FIG. 7, in which a set of i neuron elements produce respective output values $x_1$ to $x_i$, which are respectively multiplied by weighting coefficients $W1_j$ to $W_{i,j}$, with the results being applied to respective inputs of a neuron element $N_j$. The neuron element $N_j$ produces an output value y which is related to the sum total of the input values as:

$$y = F\{(w_{1j} \cdot x_1) + (w_{2j} \cdot x_2) \ldots (w_{ij} \cdot x_i)\}$$

In the above, F{ } denotes a non-linear function.

Figure 8:
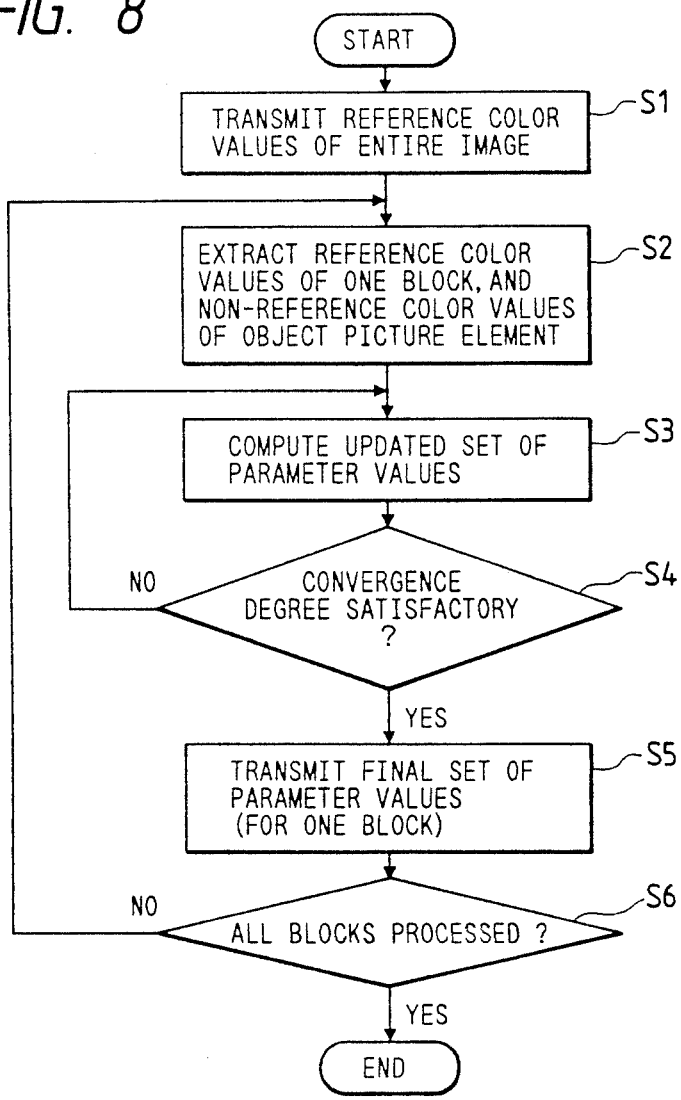
FIG. 8 is a flow diagram for illustrating the overall operation flow of the first embodiment of the invention.

FIG. 8 is a flow diagram for illustrating the basic operation flow of the data compression apparatus of the first embodiment. At the start of processing a source image (step S1) the tricolor data values of respective picture elements of the source image are written into the image memory 20 of the block extraction section 4, and the reference color data values of all of the picture elements are transmitted by the data compression apparatus. In step S2, the tricolor data values of a first block of the image are written into the block memory 21 of the block extraction section 4 and then sequentially outputted to the shift register 29 and inputted in parallel to the neural network. In step S2, a "learning" operation of the neural network is executed, i.e. based on the difference values outputted from the subtractors 35, 26 and the current values of the weighting coefficients of the neural network, an updated set of weighting coefficients are computed by the "learning" control section 41 and set into the neural network. In step S4 a decision is made by the "learning" control section 41 as to whether a satisfactory degree of convergence has been achieved (i.e. both the difference values produced from the subtractors 35, 36 are sufficiently small). If the decision is "no", then operation returns to step S2. If the answer is "yes" then the current set of weighting coefficients of the neural network are obtained i.e. (as internal condition signal 43) and are transmitted from the data compression apparatus.

A decision is then made as to whether or not all of the blocks of the source image have been processed. If not, operation returns to step S2, and steps S2 to S6 are repeated.

Thus with the first embodiment of the invention, the data compression apparatus basically transmits a set of reference color data values for the entire source image, followed by successively obtained sets of network parameter values for respective ones of the blocks of picture elements. In a corresponding data recovery apparatus which receives these transmitted data, the reference color data are inputted as successive blocks to a neural network, with a corresponding set of internal parameter values being set in the neural network at the same time. Thus, successive values of non-reference color data values (e.g. R and G values) are obtained as outputs from that neural network, so that tricolor data values for all picture elements of the image are recovered. Since each pair of non-reference color values of a picture element can be very accurately "encoded" as a combination of the set of reference color values of the picture elements of the block containing that element, in conjunction with the corresponding set of network parameter values obtained by the repetitive "learning" operation of the neural network, these non-reference color values can be recovered with a high degree of accuracy from the outputs of the neural network of the data recovery apparatus. However since the amount of information that represents a set of internal parameter values of the neural network can be very much smaller than the amount that is required to accurately express two primary color values of a picture element, highly effective data compression can be obtained for the transmitted data, i.e. code length reduction is effectively achieved.

It should be noted that although it is assumed in the above description that the reference color data values for the entire source image are transmitted by a data compression apparatus prior to sequentially transmitting the sets of internal parameter values, it would be equally possible to combine the reference color data and internal parameter data in various other ways, and to combine these data for transmission by various encoding methods known in the art. In addition, other encoding techniques for achieving a further degree of data compression could be applied to the reference color data prior to transmission.

It should also be noted that although in the above description, values of a fixed one of three primary color components are used as reference color values, it would be equally possible to use as the "reference color" value of each picture element a value which is a fixed function of the three primary color component values of the picture element, i.e. to use the luminance value of each picture element. Alternatively, it would be possible to use as the "reference color" value of each picture element a value that is a combination of the one fixed primary color component with a value obtained as a fixed function of the three primary color values of the picture element. A second embodiment of the present invention will be described. This can be of identical physical configuration to the first embodiment described above, so that further description of the configuration will be omitted, but which is controlled to function in a basically different manner from the first embodiment.

FIG. 9 is a flow diagram for illustrating the basic operation of the second embodiment. Firstly, as for the first embodiment, all of the reference color values for the source image are transmitted by the data compression apparatus (step S1), and the tricolor values of the source image are written into the image memory 20 of the block extraction section 4. A first block of reference color data values is then extracted from the image memory 20 and transferred to the shift register 29 to be applied in parallel to the neural network 30 inputs (step S2). An updated set of internal parameter values (i.e. neural network weighting coefficients) are then computed based on these input values and the current set of internal parameter values of the neural network, and are set in the neural network (step S3). A decision is then made as to whether all of the blocks of the source image have been processed (step S4). If the decision is "no", then operation returns to step S2, in which the next block of reference color data values is extracted from the block extraction section 4 and transferred to the neural network inputs. The steps S3 to S4 are then repeated (i.e. based on this new set of reference color data values that are being inputted to the neural network, and the previously established internal parameter values, an updated set of parameter values are computed and set into the neural network). Steps S2, S3 and S4 are repetitively executed in this way unitl all of the blocks of the source image have been processed. When all blocks have been processed, then a decision is made (step S5) as to whether or not a satisfactory degree of convergence has been achieved for the two output values which are produced from the neural network and inputted to the subtractors 35, 36. If a satisfactory satisfactory degree of convergence has been achieved, then the current set of internal parameter values of the neural network are transmitted by the data compression apparatus. Otherwise, operation returns to step S2, and the loop of steps S2, S3, S4 is again repetitively executed for all of the blocks of the source image.

Although the decision step S5 is shown as occurring after repetitive executions of the loop of steps S2, S3, S4 have occurred for the entire source image, this is only for simplicity of illustration. In fact, a test for convergence is performed after each execution of step S3. That is to say, if it is found during repetitions of the loop of steps S2, S3, S4 that the degree of convergence is satisfactory during every execution of step S3, i.e. that a condition has been reached in which the maximum amounts of error of the predicted output values supplied from the neural network to the subtractors 35, 36 are below a predetermined level in each repetition of the loop (i.e. for all of the blocks of the source image) then this represents a "yes" decision in step S5.

It can thus be understood that whereas with the first embodiment respective sets of internal parameter values corresponding to respective blocks of picture elements are derived and transmitted by the data compression apparatus, in the case of the second embodiment, a single set of internal parameter values is derived which is applicable to all of the blocks of the source image (i.e. which can be used in the data recovery apparatus in conjunction with the reference color data for recovering each of the non-reference color values for all of the picture elements of the image). The operation of the second embodiment is based upon the fact that with one specific set of input data values applied to a neural network, there are a plurality of respectively different sets of internal parameter values each of which will produce a desired output value (or set of output values) from the neural network. This feature is a result of the non-linear characteristics of the neuron elements and the manner in which these are mutually interconnected to form the neural network. That is to say, for each block of reference color data values, there is a plurality of possible sets of weighting coefficients each of which will provide a sufficiently low degree of error in the output prediction values from the neural network (i.e. with respect to the non-reference color values of the object picture element of the block). With the first embodiment, that feature is not utilized, and the convergence algorithm is used repetitively for each block, to find a corresponding set of network parameter values for that block which will provide a sufficiently small degree of error in the prediction values produced from the neural network.

Thus with the second embodiment, as a result of performing a number of repetitions of the loop of steps S2, S3, S4 in FIG. 9, a single set of neural network internal parameter values can finally be obtained which will provide, for all of the blocks extracted from the source image, a sufficiently low degree of error in the prediction values that are outputted from the neural network and supplied to the subtractors 35, 26.

At present, the most practical method of finding the number of repetitions of the steps S2 to S4 that are required to achieve sufficient convergence is by experiment, i.e. by visual observation to find the number of repetitions required to obtain satisfactory accuracy of reproduction in a recovered image. Specifically, a local data compression apparatus is coupled to receive the encoded output data from a data compression apparatus, with recovered tricolor data that are thereby outputted from the data recovery apparatus being supplied to a video display. An operator can then determine the number of repetitions of steps S2 to S4 that are required in order to achieve a satisfactory degree of convergence, i.e. by noting the time at which a satisfactory level of reproduction of the source image is reached after encoding operation by the data compression apparatus has been initiated. However the embodiment is not limited to such an experimental method, and it would be possible to envisage methods for automatically judging when a sufficient degree of convergence has been reached.

The data recovery apparatus of the second embodiment can be of identical configuration to that of the first embodiment. However in this case, the input control section 16 will establish in the neural network 11' of the data recovery apparatus the single set of network parameter values that has been transmitted. Thereafter, the block extraction section 4' successively supplies respective blocks of reference color data values to the neural network 11', to thereby obtain from the output terminals of the neural network successive pairs of primary color data values (e.g. R and B values, if G is the reference color) for respective picture elements of the source image.

The invention has been described in the above assuming that one of three primary colors is selected as the reference color, with all of the reference color data values of the source image being transmitted unchanged by the data compression apparatus. However such a method assumes of course that substantially all of the source image picture elements contain at least some of that reference color component. However this is not necessarily so, and assuming for example that green is selected as the reference color with that method, then satisfactory recovery of compressed data will not be possible in the case of a source image which contains regions having little or no green component. For that reason, it may be preferable to utilize as each reference color data value a value that is obtained as a function of all of the three primary color values of a picture element. For example, that function could simply consist of the sum of the three primary color component values for the picture element. That is to say, designating these as $R_c$, $B_c$ and $G_c$, the corresponding reference color data value $RF_c$ is obtained as a function of $R_c$, $B_c$, $G_c$, e.g. as $(R_c + B_c + G_c)$. In the data recovery apparatus, it will be necessary to derive one of these primary color values as a function of the (recovered) other two values and the corresponding reference color value. Assuming for example that convergence optimization of the respective sets of network parameter values (or single set of network parameter values, in the case of the second embodiment) in the data compression apparatus is executed for the R and B components, then the values $R_c$ and $B_c$ will subsequently be obtained for each picture element as outputs from the neural network of the data recovery apparatus. To obtain the remaining $G_c$ component for each picture element, it is only necessary to subtract the sum of the recovered values from the corresponding $RF_c$ value, i.e. $G_c$ is obtained as the function $\{RF_c - (R_c + B_c)\}$ in the case of the sum function having been used.

It will be apparent that each of the embodiments of the invention described above can be very easily modified to add this feature whereby each reference color value is made a function of three primary color values of an original picture element, so that detailed description will be omitted.

If the source of original image data can supply respective luminance values for the picture elements, then these can be directly utilized as reference color data values each of which is a function of the three primary color values, without the need to add a function deriving circuit to the data compression apparatus.

Alternatively, it would be possible to use, as each reference color data value, a data value which is a fixed one of the three primary color data values, in combination with a value that is a function of the three primary color values.

Thus as can be understood from the above description, a data compression and recovery apparatus according to the present invention achieves data compression by expressing two of the primary color values of each picture element of a source image as a combination of a set of reference color values of a block of respectively adjacent picture elements together with a set of network parameter values of a neural network, the network parameter values being determined such that when these parameter values are established in a neural network of a data recovery apparatus and the aforementioned set of reference color values are inputted to that neural network, the neural network will produce a pair of output values accurately corresponding to the aforementioned two primary color values of the original picture element. As a result, a high degree of data compression is achieved by comparison with direct transmission of all of the primary color values of each picture element, while a very high degree of accuracy of recovery is also achieved due to utilizing the "learning" capability of a neural network to optimize the aforementioned network parameter values.

What is claimed is:

1. A data compression and recovery apparatus for compressing and subsequently recovering data expressing a source image as an array of tricolor data sets each consisting of three primary color data values of a corresponding picture element of said source image, the apparatus comprising a data compression apparatus and a data recovery apparatus, in which said data compression apparatus comprises:

a first neural network means for adaptive processing;

first block extraction means for extracting successive blocks of m by n tricolor data sets from said source image data array, where m and n are fixed integers, said blocks respectively mutually overlap by one picture element position, and each of said reference color data values is derived from a corresponding one of said tricolor data sets, and for applying the reference color data values of an extracted block as parallel inputs of said first neural network means, while outputting a pair of primary color data values of an object picture element at a fixed position within said extracted block;

comparator means for comparing said pair of primary color data values with output data values produced from said first neural network means;

learning control means for receiving a signal representing respective current states of a set of network parameter values of said first neural network means and receiving comparison signals produced from said comparator means, and for repetitively generating and establishing in said first neural network means updated sets of network parameter values, until a predetermined degree of convergence is indicated by said comparator means output signals; and output control means for transmitting as compressed output data the reference color data values of all of said source image together with, for each of said blocks, a corresponding set of network parameter values which provide said degree of convergence;

and in which said data recovery apparatus comprises:

a second neural network means for adaptive processing;

input control means for receiving said transmitted reference color data values and sets of network parameter values;

second block extraction means for extracting successive blocks of m by n reference color data values from the received reference color data values, and;

means for establishing successive ones of said sets of network parameter values in said second neural network means, in synchronism with applying corresponding ones of said blocks of reference color data values as inputs to said second neural network means, to obtain as output data values from said second neural network means successive pairs of primary color data values for respective picture elements of said source image.

2. A data compression and recovery apparatus for compressing and subsequently recovering data expressing a source image as an array of tricolor data sets each comprising three primary color data values of a corresponding picture element of said source image, the apparatus comprising a data compression apparatus and a data recovery apparatus, in which said data compression apparatus comprises:

a first neural network means for adaptive processing;

first block extraction means for extracting successive blocks of m by n reference color data values from said source image data array, where m and n are fixed integers, said blocks successively mutually overlap by one picture element position, and each of said reference color data values is derived from a corresponding one of said tricolor data sets, and for supplying the data values of an extracted block as parallel inputs to said first neural network means while outputting a pair of primary color data values of an object picture element which is at a fixed position within said extracted block;

comparator means for comparing said pair of primary color data values with output data values produced from said first neural network means;

learning control means coupled to receive a signal representing respective current states of a set of network parameter values of said first neural network means and to receive comparison output signals produced from said comparator means, for repetitively executing a procedure whereby data values of an extracted block are supplied to input terminals of said first neural network means, an updated set of network parameter values is derived based on a current set of network parameter values and on said comparator output signals, the updated set of network parameter values are established in the first neural network means, and data values of a succeeding block are applied as inputs to the first neural network means, said procedure being repeated for all of said source image a plurality of times, until a desired degree of convergence is obtained between said neural network output data values and pairs of object picture element primary color data values for substantially all of said blocks; and output control means for transmitting, as compressed output data, the reference color data values of all of said source image together with a final set of network parameter values established at completion of said procedure repetitions;

and in which said data recovery apparatus comprises:

a second neural network means for adaptive processing of identical configuration to said first neural network means;

input control means for receiving said transmitted receiving color data values and set of network parameter values;

second block extraction means for extracting successive blocks of m by n reference color data values from the received reference color data values, and;

control means for fixedly establishing said set of network parameter values in said second neural network means and for successively applying said blocks of reference color data values as inputs to said second neural network means, for thereby obtaining as output data values from said second neural network means successive pairs of primary color data values for respective picture elements of said source image.

3. A data compression and recovery apparatus according to claim 1, in which prior to transmission of said reference color data values and network parameter values, the reference color data values and network parameter values outputted from said data compression apparatus are supplied to a local data recovery apparatus and recovered data from the local data recovery apparatus are displayed by a display device, and in which a requisite number of repetitions of said procedure is determined by visual comparison of said source image with an output image produced by said display device.

4. A data compression and recovery apparatus according to claim 1 or 2, in which each of said reference color data values is a fixed one of said primary color data values of a picture element.

5. A data compression and recovery apparatus according to claim 1 or 2, in which each of said reference color data values is a function of a plurality of said primary color data values of a picture element.

6. A data compression and recovery apparatus according to claim 1 or 2, in which each of said reference color data values is a combination of a fixed one of said primary color data values of a picture element with a value that is a function of a plurality of the primary color data values of the picture element.

7. A data compression and recovery apparatus for compressing and subsequently recovering data expressing a source image as an array of tricolor data sets each comprising three primary color data values of a corresponding picture element of said source image, the apparatus comprising a data compression apparatus and a data recovery apparatus, in which said data compression apparatus comprises:

a first neural network means for adaptive processing;

means for successively deriving, for each picture element of said source image, a corresponding set of parameter values for said first neural network means such that values respectively substantially identical to two of the primary color data values of said each picture element are generated from said first neural network means when reference color data values of a block of picture elements including said each picture element are inputted to said first neural network means; and means for transmitting said sets of parameter values and respective reference color data values of all of said source image;

and in which said data recovery apparatus receives aid transmitted parameter values and reference color data values and comprises:

a second neural network means for adaptive processing;

means for successively establishing said sets of parameter values in said second neural network means in synchronism with inputting to said second neural network means the reference color data values of successive blocks respectively corresponding to said sets of parameter values, for thereby successively obtaining as output values from said second neural network means said first and second primary color values of all of said picture elements.

8. A data compression and recovery apparatus for compressing and subsequently recovering data expressing a source image as an array of tricolor data sets each comprising three primary color data values of a corresponding picture element of said source image, the apparatus comprising a data compression apparatus and a data recovery apparatus, in which said data compression apparatus comprises:

a first neural network means for adaptive processing;

means for successively deriving for all of the picture elements of said source image a single set of parameter values for said first neural network means such that, for each of said picture elements, values respectively substantially identical to two of the primary color data values of said each picture element are generated from said first neural network means when reference color data values of a block of picture elements including said each picture element are inputted to said first neural network means; and means for transmitting said set of parameter values and respective reference color data values of all of said source image;

and in which said data recovery apparatus receives said transmitted parameter values and reference color data values and comprises:

a second neural network means for adaptive processing;

means for establishing said set of parameter values in said second neural network means, and for successively inputting to said second neural network means reference color data values of successive ones of said blocks, for thereby successively obtaining as output value from said second neural network means said first and second primary color values of all of said picture elements.

9. A data compression and recovery apparatus according to claim 7 or 8, in which each of said reference color data values is a fixed one of said primary color data values of a picture element.

10. A data compression and recovery apparatus according to claim 7 or 8, in which each of said reference color data values is a function of a plurality of said primary color data values of a picture element.

11. A data compression and recovery apparatus according to claim 7 or 8, in which each of said reference color data values is a combination of a fixed one of said primary color data values of a picture element with a value that is a function of a plurality of the primary color data values of the picture element.

* * * * *

UNITED STATES PATENT AND TRADEMARK OFFICE
CERTIFICATE OF CORRECTION

PATENT NO. : 5,041,916

DATED : August 20, 1991

INVENTOR(S) : Yoshida et al.

It is certified that error appears in the above-identified patent and that said Letters Patent is hereby corrected as shown below:

On THE TITLE PAGE: Item [30]

The foreign application priority data is incorrect. It should read as follows:

Feb. 7, 1989 [JP]    Japan ................ 1-28187
    Feb. 16, 1989 [JP]    Japan ................ 1-36783

Signed and Sealed this

Twenty-third Day of February, 1993

Attest:

STEPHEN G. KUNIN

Attesting Officer    Acting Commissioner of Patents and Trademarks